(12) United States Patent
Batarseh

(10) Patent No.: US 11,572,773 B2
(45) Date of Patent: Feb. 7, 2023

(54) ELECTROMAGNETIC WAVE HYBRID TOOL AND METHODS

(71) Applicant: Saudi Arabian Oil Company, Dhahran (SA)

(72) Inventor: Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/319,858

(22) Filed: May 13, 2021

(65) Prior Publication Data

US 2022/0364445 A1   Nov. 17, 2022

(51) Int. Cl.
 *E21B 43/24* (2006.01)
 *C09K 8/594* (2006.01)
 *C09K 8/592* (2006.01)

(52) U.S. Cl.
 CPC .............. *E21B 43/24* (2013.01); *C09K 8/592* (2013.01); *C09K 8/594* (2013.01)

(58) Field of Classification Search
 CPC .......... E21B 43/24; C09K 8/592; C09K 8/594
 USPC ..................................................... 166/305.1
 See application file for complete search history.

(56) References Cited

U.S. PATENT DOCUMENTS

| 4,228,856 A | 10/1980 | Reale |
| 6,888,097 B2 | 5/2005 | Batarseh |
| 7,487,834 B2 * | 2/2009 | Reed ........................ E21B 43/11 166/302 |
| 8,748,687 B2 * | 6/2014 | Sirdeshpande .......... C10J 3/463 48/127.5 |
| 9,353,612 B2 | 5/2016 | Batarseh |
| 9,453,400 B2 | 9/2016 | Wheeler et al. |

(Continued)

FOREIGN PATENT DOCUMENTS

| CN | 203081295 U | 7/2013 |
| CN | 109025950 A | 12/2018 |

(Continued)

OTHER PUBLICATIONS

Al-Nakhli, Ayman R. et al.; "In Situ Steam Generation: A New Technology Application for Heavy Oil Production" Summer 2017 Saudi Aramco Journal of Technology; pp. 12-22.

Castrogiovanni, Anthony et al.; "Benefits and Technical Challenges of Downhole Steam Generation for Enhanced Oil Recovery" CSUG/SPE 149500, Canadian Unconventional Resources Conference, Calgary, Alberta, Nov. 15-17, 2011; pp. 1-11.

(Continued)

*Primary Examiner* — William D Hutton, Jr.
*Assistant Examiner* — Ashish K Varma
(74) *Attorney, Agent, or Firm* — Bracewell LLP; Constance G. Rhebergen; Eleanor L. Tyson

(57) ABSTRACT

An apparatus for producing steam in-situ, the apparatus comprising an activated carbon container configured to hold activated carbon; a water supply fluidly connected to the activated carbon container, the water supply configured to provide water directly to the activated carbon container; an inter-container valve fluidly connected to the activated carbon container, the inter-container valve configured to let steam flow from the activated carbon container to a steam container; the steam container fluidly connected to the inter-container valve, the steam container configured to hold the steam that flows from the activated carbon container; and one or more release valves fluidly connected to the steam container, the one or more release valves configured to release steam from the steam container.

12 Claims, 5 Drawing Sheets

(56) References Cited

U.S. PATENT DOCUMENTS

| | | | |
|---|---|---|---|
| 9,644,464 B2 | 5/2017 | Batarseh | |
| 9,796,047 B2 * | 10/2017 | Saenger | B23K 26/211 |
| 9,939,421 B2 * | 4/2018 | Batarseh | G01N 33/24 |
| 2004/0256103 A1 | 12/2004 | Batarseh | |
| 2007/0202452 A1 | 8/2007 | Rao | |
| 2009/0200032 A1 | 8/2009 | Foret | |
| 2013/0228372 A1 | 9/2013 | Linyaev et al. | |
| 2014/0090839 A1 | 4/2014 | Al-Nakhli et al. | |
| 2014/0190691 A1 | 7/2014 | Vinegar et al. | |
| 2014/0360778 A1 | 12/2014 | Batarseh | |
| 2021/0229219 A1 | 7/2021 | Alabbad et al. | |

FOREIGN PATENT DOCUMENTS

| | | |
|---|---|---|
| NZ | 607028 A | 8/2014 |
| WO | 2011112513 A2 | 9/2011 |
| WO | 2014055574 A1 | 4/2014 |
| WO | 20160004323 A3 | 1/2016 |
| WO | 2017100354 A1 | 6/2017 |
| WO | 20170163265 A1 | 9/2017 |

OTHER PUBLICATIONS

International Search Report and Written Opinion for International Application No. PCT/US2022/028795, report dated Aug. 16, 2022; pp. 1-15.

Batarseh, Sameeh et al.; "Flow Enhancement by High Power Laser Technology" IPTC-19308-MS, International Petroleum Technology Conference, Beijing, China, Mar. 26-28, 2019; pp. 1-7.

Batarseh, Sameeh I. et al.; "High Power Laser Technology in Downhole Applications, Reshaping the Industry" SPE-188507-MS, Abu Dhabi International Petroleum Exhibition & Conference, Abu Dhabi, UAE, Nov. 13-16, 2017; pp. 1-15.

International Search Report and Written Opinion for International Application No. PCT/US2022/028788, report dated Jul. 29, 2022; pp. 1-16.

International Search Report and Written Opinion for International Application No. PCT/US2022/028789, report dated Jul. 29, 2022; pp. 1-15.

Othman, Haitham et al.; "Effective Wellbore Stimulation Methods Utilizing Advanced Thermal Technologies" OTC-30056-MS, Offshore Technology Conference Asia, Nov. 2-6, 2020; pp. 1-15.

* cited by examiner

ELECTROMAGNETIC WAVE HYBRID TOOL AND METHODS

TECHNICAL FIELD

Disclosed are apparatus and methods for steam production. More specifically, embodiments related to apparatus and methods that incorporate lasers for steam production are provided.

BACKGROUND

Enhanced oil recovery is a branch of petroleum engineering that focuses on recovery of reservoir heavy oil through enhanced flow from the formation to the wellbore for production. Heavy oil can be defined as having an API gravity of less than 29 with a viscosity greater than 5000 cP, To produce heavy oil from a formation, the communication between the formation containing the heavy oil and the wellbore needs to be improved such that the heavy oil flows to the surface, therefore, viscosity reduction is a must for the flow.

One method of reducing viscosity of the heavy oil is to increase the temperature in the formation. Increased temperature in different forms can lower viscosity and allow the oil to flow. Increased temperatures can be introduced by steam injection, in-situ combustion or electromagnetic heating, including through the use of microwave. Use of radio frequencies can only reach temperatures of 800° C. and cannot be precisely controlled. Steam injection uses steam as a thermal heating method.

There are several issues and limitations with conventional methods using steam to increase the temperature of the formation. Heat loss is one of the main issues due to the steam traveling via the steam pipes for long distances. Heat loss occurs because the pipes are split several time to distribute the steam for different injector wells, which causes heat loss especially in the cold and in the winter season. Heat loss also occurs in the wellbore when the steam travels from the wellhead to the injector. Heat loss causes losses of steam quality which makes it inefficient. Another concern is the safety of conventional steam methods, as the steam travels on the surface via pipelines, the pipelines can be damaged with time, rust or accident which causes hot steam to vent in the air and causes damage to anything which the steam comes in contact.

SUMMARY

Disclosed are apparatus and methods for steam production. More specifically, embodiments related to apparatus and methods that incorporate lasers for steam production are provided.

In a first aspect, an apparatus for producing steam in-situ is provided. The apparatus includes an activated carbon container configured to hold activated carbon, a water supply fluidly connected to the activated carbon container, the water supply configured to provide water directly to the activated carbon container, an inter-container valve fluidly connected to the activated carbon container, the inter-container valve configured to let steam flow from the activated carbon container to a steam container, the steam container fluidly connected to the inter-container valve, the steam container configured to hold the steam that flows from the activated carbon container, and one or more release valves fluidly connected to the steam container, the one or more release valves configured to release steam from the steam container.

In certain aspects, the activated carbon container is constructed from optical glass. In certain aspects, the activated carbon container is a toroid shape such that the activated carbon is contained in the annulus between a fiber optic cable and the outer shell of the activated carbon container. In certain aspects, the inter-container valve is a one-way valve. In certain aspects, the activated carbon container is constructed from optical glass. In certain aspects, the apparatus further includes a surface unit, the surface unit configured to produce a laser beam, and the fiber optic cable configured to transmit the laser beam from the surface unit to the activated carbon container. In certain aspects, the release valves release steam into the formation. In certain aspects, the release valves release steam into a steam pipe, where the steam pipes collect steam from one or more steam containers.

In a second aspect, method of producing steam is provided. The method includes the steps of transmitting a laser beam to an activated carbon container through a fiber optic cable, where the activated carbon container includes activated carbon, where the laser beam contacts the activated carbon, increasing a temperature of the activated carbon to produce hot activated carbon, introducing water through a water supply into the activated carbon container, where the water contacts the hot activated carbon in the activated carbon container, generating steam as the water contacts the hot activated carbon in the activated carbon container, releasing steam from the activated carbon container through an inter-container valve to a steam container, accumulating steam in the steam container, and releasing stream through one or more steam release valves in the steam container.

In certain aspects, the method further includes the steps of generating the laser beam in a surface unit located at a surface, where the surface is selected from the surface of earth proximate to a wellbore and an offshore platform. In certain aspects, the method further includes the step of increasing a temperature of a formation due to the steam released through the release valves. In certain aspects, the method further includes the steps of collecting the steam released through the release valves in a steam pipe, where the steam pipes collect steam from one or more steam containers, and releasing the steam in the steam pipe through one or more vents, where the one or more vents is in a target zone of the formation.

BRIEF DESCRIPTION OF THE DRAWINGS

These and other features, aspects, and advantages will become better understood with regard to the following descriptions, claims, and accompanying drawings. It is to be noted, however, that the drawings illustrate only several embodiments and are therefore not to be considered limiting of the inventive scope as it can admit to other equally effective embodiments.

In the accompanying Figures, similar components or features, or both, may have a similar reference label.

DETAILED DESCRIPTION

While the scope will be described with several embodiments, it is understood that one of ordinary skill in the relevant art will appreciate that many examples, variations and alterations to the apparatus and methods described are within the scope and spirit of the embodiments. Accordingly, the embodiments described here are set forth without any loss of generality, and without imposing limitations. Those of skill in the art understand that the inventive scope includes all possible combinations and uses of particular features described in the specification. In both the drawings and the detailed description, like numbers refer to like elements throughout.

Described are an apparatus and methods for producing steam in-situ using laser energy. The steam generation tool combines laser energy combined with activated carbon to generate in-situ steam. The steam generation system can be used to produce heavy oil, for stimulation, and for offshore steam injection. Advantageously, when the activated carbon is exposed to the laser energy it heats up instantly reaching high temperature in seconds. The activated carbon in the steam generation system can be in the form of gravel. A laser beam passes through the activated carbon and heating it up, then water is injected into the hot activated carbon for steam generation. The steam can be used to increase a temperature of the formation to produce heavy oil or can be used for stimulation.

Advantageously, the steam generation tool described combines high power laser energy with activated carbon to generate heat and steam without damaging the formation. Advantageously, the steam generation system produces in-situ steam which reduces the heat loss as steam does not travel from the surface. Advantageously, the steam generation system is a compact tool that can fit through the wellbore and be positioned in the formation. Advantageously, the steam generation system allows for temperature increase of activated carbon in less than 3 minutes to temperatures greater than 1700° C. and when the activated carbon is wet temperatures greater than 1500° C. Advantageously, the steam generation tool can produce in-situ steam in less than 3 minutes. Advantageously, the steam generation tool provides a method for in-situ steam generation and eliminates heat lost as the steam is generated. Advantageously, the compact size of each steam generation segment allows placement of multiple steam generation segments in one wellbore, such that steam can be produced in different zones of the wellbore simultaneously. Advantageously, the amount and quality of steam produced in each zone can be controlled with the steam generation tool.

As used throughout, "activated carbon" refers to carbon that has been treated with the result being a highly porous carbon with increased surface area.

Figure 1:
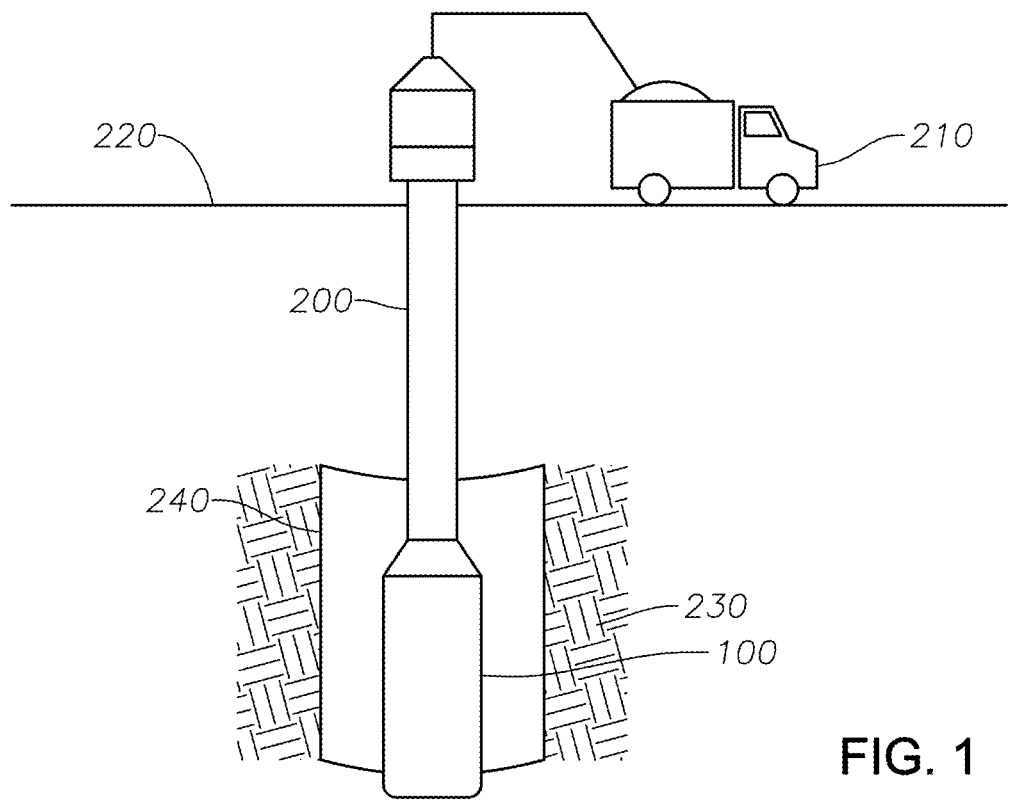
FIG. 1 is an orthogonal view of an embodiment of the steam generation tool.

The steam generation tool to produce in-situ steam can be understood with reference to FIG. 1. Fiber optic cable 200 carries a laser beam from surface unit 210 positioned at surface 220 proximate to wellbore 240 in formation 230 to steam generator segment 100. Surface unit 210 produces a laser beam. Surface unit 210 can be any type of laser generating unit capable of producing a laser beam with more than 2 kW power. In at least one embodiment, surface unit 210 can include a ytterbium fiber laser at a wavelength of 1062 nm.

Figure 2:
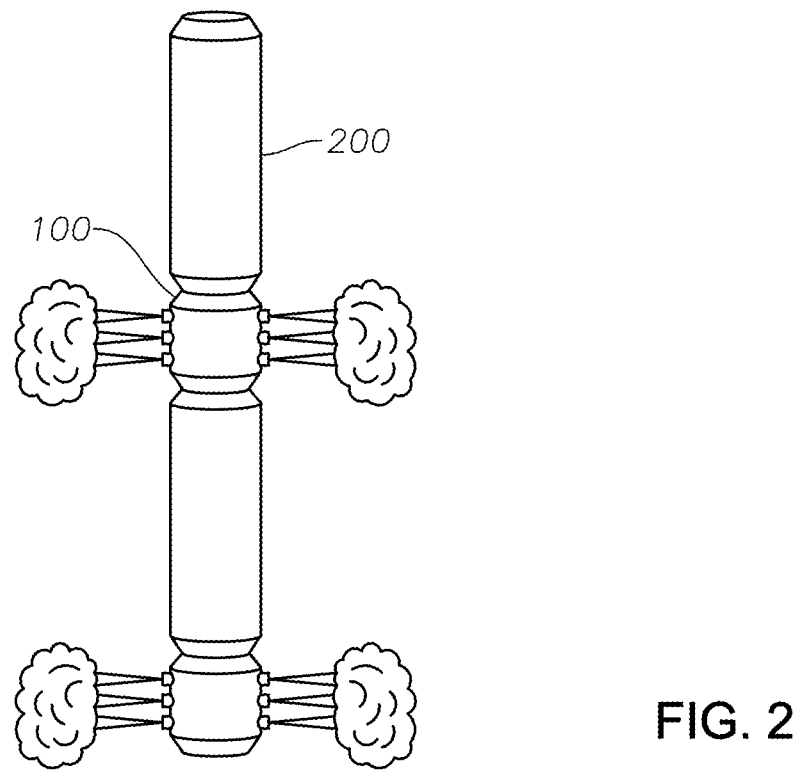
FIG. 2 is a perspective view of an embodiment of the steam generation tool.

One or more steam generator segments 100 are arranged in series along fiber optic cable 200, as shown in FIG. 2. The connection between each steam generator segment 100 and fiber optic cable can rotate around an axis to control where in the formation the steam is released and to control distribution of steam around the wellbore.

Figure 3:
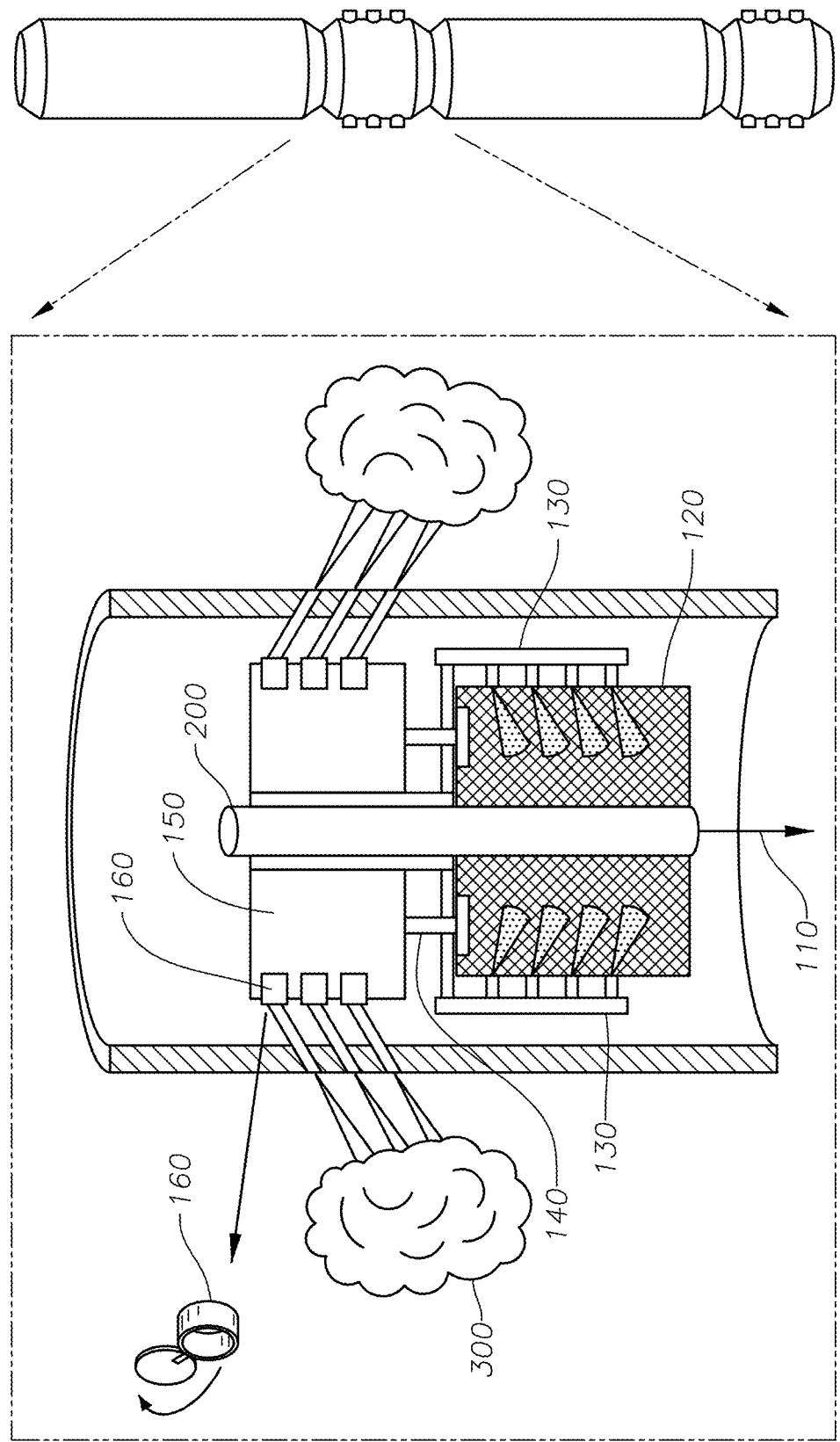
FIG. 3 is a perspective view of an embodiment of the steam generation tool.

Each steam generator segment 100 can be understood with reference to FIG. 3. Laser beam 110 is introduced through fiber optic cable 200. Laser beam 110 passes through activated carbon container 120.

Activated carbon container 120 can be any type of compartment capable of holding an amount of activated carbon. Activated carbon container 120 can be constructed of any high pressure, high heat resistant material that allows a laser beam to pass into the compartment. Activated carbon container 120 separates the activated carbon such that the activated carbon does not contact the formation or the wellbore. In at least one embodiment, the surface of activated carbon container 120 through which laser beam 110 passes is constructed of optical glass. Optical glass can be any material that allows laser beam 110 to pass through without a change to its physical or chemical characteristics or its physical shape or dimensions. In at least one embodiment the optical glass is constructed from sapphire. Activated carbon container 120 contains activated carbon. Activated carbon container 120 can have a toroid shape where the activated carbon is contained in the annulus between the fiber optic cable and the outer shell of the activated carbon container.

Activated carbon can be any type of activated carbon the temperature of which can be increased without impacting the physical shape or dimensions of activated carbon. Advantageously, activated carbon is used because it can be rapidly heated when exposed to a laser beam, can be molded into any desired shape, and can be designed to have any size desired. Activated carbon can be in the form of gravel, pebbles, or other shape. In at least one embodiment activated carbon is in the form of gravel. Laser beam 110 contacts the activated carb on activated carbon container 120.

The temperature of activated carbon can be increased in activated carbon container 120 due to laser beam 110 to produce hot activated carbon at a target temperature. The target temperature of hot activated carbon can be between 800° C. and 1795° C., and alternately between 1564° C. and 1795° C. The target temperature is less than the combustion temperature of activated carbon. Advantageously, the use of activated carbon is more efficient than using a laser to heat water directly, which can lose about 33% of energy per inch of water. The target temperature of hot activated carbon can be determined in a lab based on the volume of activated carbon, the power of the laser beam, and the desired heating time. In at last one embodiment, the target temperature is 1795° C.

Water supply 130 provides water from the surface to steam generator segment 100. Water supply 130 can be any type of piping that is high pressure, high heat resistant. Water supply 130 can supply water directly to activated carbon container 120. Water supply 130 can contain nozzles connecting piping from the surface to activated carbon container 120, such that the water flows through the nozzles into activated carbon container 120. The flow rate of the water through water supply 130 can be based on the volume of activated carbon and the target temperature. Water is supplied through water supply 130 once the hot activated carbon is reached.

As the water from water supply 130 contacts the hot activated carbon steam is formed. One or more inter-container valves 140 carry steam from activated carbon container 120 to steam container 150. Inter-container valves 140 can be any type of one-way valve that allows steam to flow from activated carbon container 120 to steam container 150, but do not allow steam to flow from steam container 150 to activated carbon container 120. Inter-container valves 140 can be constructed from any material that can withstand the pressure and temperature of steam. In at least one embodiment, each inter-container valve 140 is a check valve. In at least one embodiment, each inter-container valve 140 is a pressure relief valve. Inter-container valves 140 can be operated according to a pressure set point, such that inter-container valves 140 open when the pressure set point is reached.

Steam container 150 collects steam produced in activated carbon container 120. Steam container 150 can be any type of container configured to hold pressurized steam.

One or more release valves 160 are positioned between steam container 150 and the surrounding formation. Each release valve 160 can be any type of one-way valve that allows steam to flow from steam container 150 to the formation. In at least one embodiment, each release valve 160 can be a check valve. Each release valve 160 can be operated according to a release set point such that each release valve 160 opens when the release set point is reached. Opening release valves 160 on a release set point ensures that the steam released in the formation is released with force. The release set point can be a pressure less than the formation cracking pressure, such that the released steam does not crack the formation. The release set point can be between 800 psi (5,515 kPa) and 1200 psi (8,273 kPa).

The steam released into the formation can be at a temperature greater than 204° C. (400° F.), alternately between 204° C. (400° F.) and 300° C. (572° F.), alternately between 204° C. (400° F.) and 250° C. (482° F.), and alternately between 204° C. (400° F.) and 225° C. (437° F.). In at least one embodiment, the steam is at a temperature greater than 204° C. (400° F.). Advantageously, maintaining the temperature of the steam in this range can eliminate damage to the formation. The temperature of the steam can be controlled by the amount of activated carbon, the power of laser beam 110, and the exposure time.

FIGS. 2 and 3 depict steam 300 being released through release valves 160.

Each steam generation segment 100 can be operated independently. In at least one embodiment, all steam generation segments 100 can be operated simultaneously, such that steam is released from each steam generation segment 100 simultaneously. In at least one embodiment, each steam generation segment 100 can be operated independently such that less than 100% of steam generation segments 100 are producing steam at a given point in time. Advantageously, operating each steam generation system separately enables control over production, a specific target zone 55 to be targeted, and maximum recovery.

Figure 4:
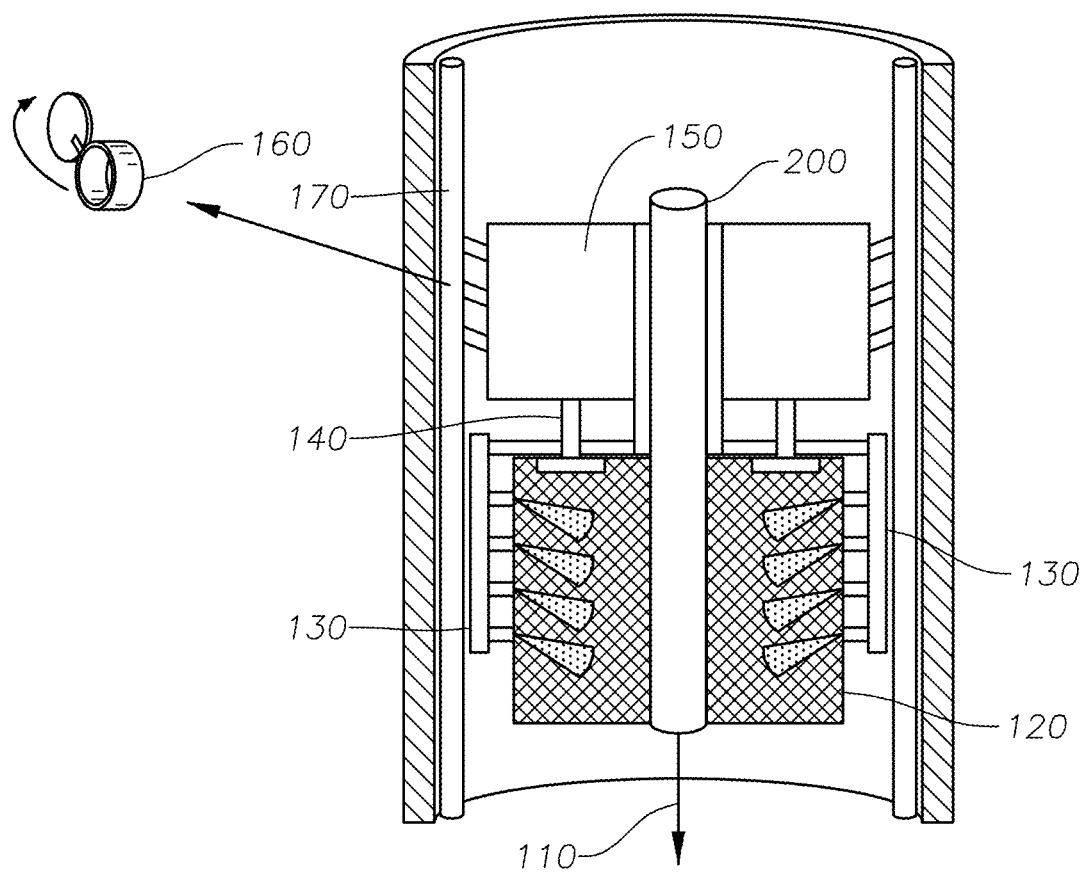
FIG. 4 is a perspective view of an embodiment of the steam generation tool.
Figure 5:
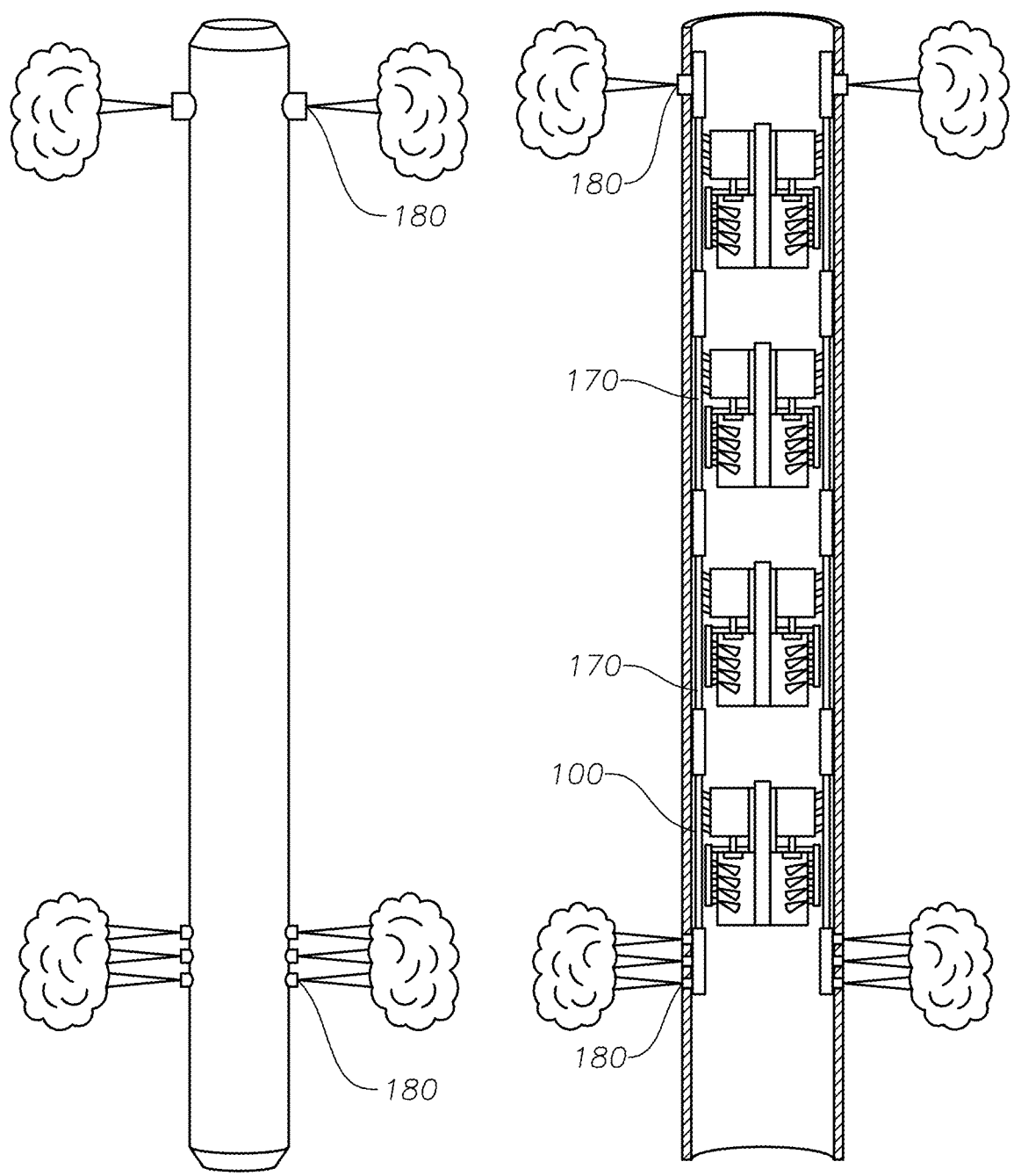
FIG. 5 is a perspective view of an embodiment of the steam generation tool.

Referring to FIGS. 4 and 5, an alternate embodiment of the steam generation tool is provided. Release valves 160 on each steam generation segment 100 are connected to steam pipe 170, such that the steam produced in each steam generation segment 100 accumulates in steam pipe 170. As each steam generation segment 100 produces steam the pressure builds up in steam pipe 170. Steam generation tool can have vents 180 positioned at the target zone of the formation. The target zone of the formation can be identified prior to deployment of steam generation tool based on wellbore and formation data and the desired wellbore activity. The size, shape, and number of vents 180 in each target zone can be based on the volume of steam to be released. In at least one embodiment, two vents 180 are positioned 180 degrees from each other around the axis of steam generation tool 100 in the target zone. In at least one embodiment, more than two vents are positioned around the axis of steam generation tool 100. Each vent 180 can be a one-way valve allowing steam to flow into the formation and preventing flow back into steam generation tool 100.

The method of using the steam generation tool can be understood with reference to FIG. 1-3. Steam generation segment 100 can be lowered into the target zone in formation 230 through wellbore 240 connected to surface 220 by fiber optic cable 200. Laser beam 110 is produced in surface unit 210 and transmitted to steam generation segment 100. The temperature of activated carbon in activated carbon container 120 is increased to the target temperature between 30 seconds and 3 minutes to produce the hot activated carbon. Water is injected into activated container 120 through water supply 130. The water forms steam when it contacts the hot activated carbon. Steam flows through inter-container valve 140 to steam container 150. Pressure in steam container 150 builds until a release set point is reached. When the released set point is reached steam is released through release valves 160.

The steam released through release valves 160 is released into the formation or into steam pipes 170. When released to the formation, the steam increases a temperature of the formation proximate to steam generator segment 100. When released into steam pipes 170, the steam flows to a target zone of the formation and is released to the target zone through vents 180 increasing a temperature in the target zone.

The steam escaping from the steam generation tool can be used for a wellbore activity. Wellbore activities can include increase a temperature of a formation without damaging the formation, improve the efficiency of increasing a temperature of a wellbore, wellbore clean-up, stimulating a reservoir, improving the efficiency of laser material interaction, steam assisted oil recovery, injecting steam from an offshore platform into an offshore reservoir, and combinations of the same. Advantageously, the steam generating tool described can be used to generate and inject steam on offshore platforms where conventional steam generators are bulky and cannot fit on offshore platforms. When used in an offshore environment, the surface on which the laser unit sits is the offshore platform.

The steam generation tool is in the absence of steam traveling through the wellbore from the surface as the steam is produced in-situ. The steam generation tool is in the absence of microwaves or microwave energy. The steam generation tool is in the absence of ceramic materials. The use of the steam generation tool is in the absence of ceramic materials deployed in the wellbore and formation. While residual or naturally-occurring water in the formation can be converted to steam, the use of the steam generation tool does not rely on the presence of such water to produce steam, rather the water required to produce steam is piped into the steam generation tool. The steam generation tool is in the absence of injecting water into the formation. In the steam generation tool and methods for producing in-situ steam, the activated carbon does not ignite or combust upon application of the laser beam. The steam generation tool is in the absence of heating the formation directly with the laser, which is inefficient. The steam generation tool operates in the absence of explosive force. The steam released through the steam generation tool does not penetrate or spall the formation surrounding the steam generation tool.

EXAMPLES

Figure 6:
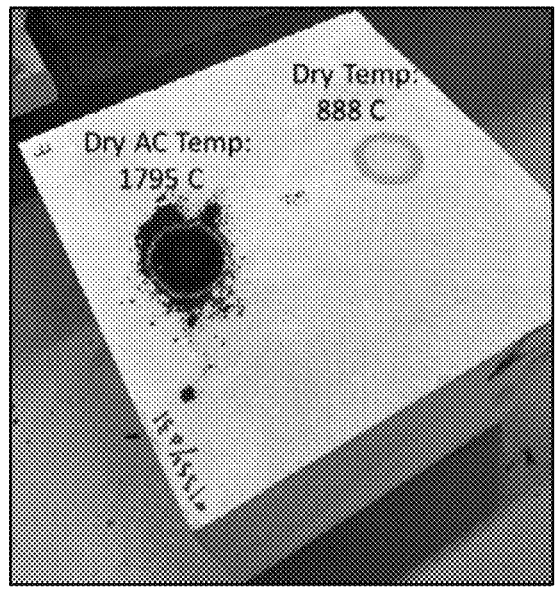
FIG. 6 is a pictorial representation from Example 1.

Example 1. Example 1 Demonstrates that a Laser can be Used to Increase a Temperature of Activated Carbon to Produce Hot Activated Carbon One area of a block of limestone was covered with activated carbon, as shown in FIG. 6. A second area was left exposed without activated carbon. A laser beam of 1 kW was emitted on both areas, with and without activated carbon. An infra-red (IR) camera was used to capture the temperature of the limestone black in the two areas after being heated for a duration of 30 seconds.

The maximum temperature reached in the area without activated carbon recorded by the IR camera was 888° C. The maximum temperature reach in the area with activated carbon recorded by the IR camera was 1795° C.

In addition to demonstrating the concept, the examples shows that the temperature increase is more effective using activated carbon compared to rocks, such as limestone.

Figure 7:
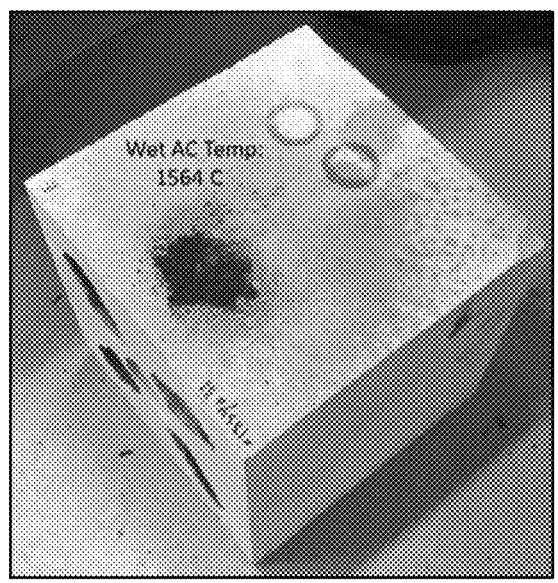
FIG. 7 is a pictorial representation from Example 2.

Example 2. Example 2 Demonstrates the Efficiency of Heating Wet Activated Carbon Water was added to the area of activated carbon from Example 1. The wet area with activated carbon was heated with the 1 kW laser beam for 30 seconds. The maximum temperature reached in the area as recorded by the IR camera was 1564° C. as shown in FIG. 7.

Although the technology has been described in detail, it should be understood that various changes, substitutions, and alterations can be made hereupon without departing from the inventive principle and scope. Accordingly, the scope of the embodiments should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed as from one particular value to another particular value. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art, except when these references contradict the statements made here.

As used here and in the appended claims, the words "comprise," "has," and "include" and all grammatical variations thereof are each intended to have an open, non-limiting meaning that does not exclude additional elements or steps.

What is claimed is:

1. An apparatus for producing steam in-situ, the apparatus comprising:
   an activated carbon container configured to hold activated carbon, wherein the activated carbon container is in the absence of ceramic materials, wherein the activated carbon is treated carbon that is porous with an increased surface area compared to untreated carbon;
   a water supply fluidly connected to the activated carbon container, the water supply configured to provide water directly to the activated carbon container;
   an inter-container valve fluidly connected to the activated carbon container, the inter-container valve configured to let steam flow from the activated carbon container to a steam container;
   the steam container fluidly connected to the inter-container valve, the steam container configured to hold the steam that flows from the activated carbon container; and
   one or more release valves fluidly connected to the steam container, the one or more release valves configured to release steam from the steam container.

2. The apparatus of claim 1, where the activated carbon container is constructed from optical glass.

3. The apparatus of claim 1, where the activated carbon container is a toroid shape such that the activated carbon is contained in the annulus between a fiber optic cable and the outer shell of the activated carbon container.

4. The apparatus of claim 1, where the inter-container valve is a one-way valve.

5. The apparatus of claim 1, where the activated carbon container is constructed from optical glass.

6. The apparatus of claim 1, further comprising:
   a surface unit, the surface unit configured to produce a laser beam; and
   the fiber optic cable configured to transmit the laser beam from the surface unit to the activated carbon container.

7. The apparatus of claim 1, wherein the release valves release steam into the formation.

8. The apparatus of claim 1, wherein the release valves release steam into a steam pipe, wherein the steam pipes collect steam from one or more steam containers.

9. A method of producing steam, the method comprising the steps of:
   transmitting a laser beam to an activated carbon container through a fiber optic cable, wherein the activated carbon container comprises activated carbon, wherein the laser beam contacts the activated carbon, wherein the activated carbon container is in the absence of ceramic materials, wherein the activated carbon is treated carbon that is porous with an increased surface area compared to untreated carbon;
   increasing a temperature of the activated carbon to produce hot activated carbon;
   introducing water through a water supply into the activated carbon container, where the water contacts the hot activated carbon in the activated carbon container;
   generating steam as the water contacts the hot activated carbon in the activated carbon container;
   releasing steam from the activated carbon container through an inter-container valve to a steam container;
   accumulating steam in the steam container; and
   releasing stream through one or more steam release valves in the steam container.

10. The method of claim 9, further comprising the steps of:
    generating the laser beam in a surface unit located at a surface, wherein the surface is selected from the surface of earth proximate to a wellbore and an offshore platform.

11. The method of claim 9, further comprising the step of increasing a temperature of a formation due to the steam released through the release valves.

12. The method of claim 9, further comprising the steps of:
   collecting the steam released through the release valves in a steam pipe, wherein the steam pipes collect steam from one or more steam containers; and
   releasing the steam in the steam pipe through one or more vents, wherein the one or more vents is in a target zone of the formation.

\* \* \* \* \*